United States Patent
Barenys et al.

(10) Patent No.: US 6,516,367 B1
(45) Date of Patent: Feb. 4, 2003

(54) METHOD AND SYSTEM FOR DETECTING BUS DEVICE CONFIGURATION CHANGES

(75) Inventors: Michael Anton Barenys, Austin, TX (US); Douglas Michael Boecker, Rochester, MN (US); Joel Gerard Goodwin, Austin, TX (US); Paul Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,707

(22) Filed: Jun. 24, 1999

(51) Int. Cl.$^7$ .............................................. G06F 13/00
(52) U.S. Cl. ............................. 710/109; 710/104; 713/2
(58) Field of Search ................................. 710/109, 110, 710/104, 105, 302, 8, 10, 300, 301; 713/2, 100

(56) References Cited

U.S. PATENT DOCUMENTS

| | | | | |
|---|---|---|---|---|
| 5,444,642 A | * | 8/1995 | Montgomery et al. | 702/91 |
| 5,781,798 A | * | 7/1998 | Beatty et al. | 710/10 |
| 5,787,246 A | * | 7/1998 | Lichtman et al. | 709/220 |
| 5,819,107 A | * | 10/1998 | Lichtman et al. | 710/8 |
| 5,834,856 A | | 11/1998 | Tavallaei et al. | 307/64 |
| 6,003,097 A | * | 12/1999 | Richman et al. | 710/8 |
| 6,178,520 B1 | * | 1/2001 | DeKoning et al. | 714/5 |

OTHER PUBLICATIONS

"Dynamic Update Capability Determining Planar Board Features," IBM Technical Disclosure, vol. 37, No. 06B, Jun. 1994, pp. 113–114.

U.S. patent application Ser. No. 09/163,992 entitled "An I$^2$C Bus Expansion Apparatus And Method Therefor," by Goodwin, et al, filed Sep. 30, 1998.

* cited by examiner

Primary Examiner—Peter Wong
Assistant Examiner—X. Chung-Trans
(74) Attorney, Agent, or Firm—Andrea Pair Bryant; Mark E. McBurney

(57) ABSTRACT

A method, system and computer program product are provided for detecting the presence of devices, particularly hot plug devices, connected to a bus both during start-up of a computer system and while the system is running. At start-up, and periodically thereafter, all possible device connections are polled by microprocessors, called sub-bus controllers, which include logic for generating a map of components present on each bus. Each map is accessible by the master bus controller. During system run-time, periodic polling, may be continuous thereby providing a real time device status map for every available bus connection.

20 Claims, 3 Drawing Sheets

METHOD AND SYSTEM FOR DETECTING BUS DEVICE CONFIGURATION CHANGES

BACKGROUND OF THE INVENTION

1. Technical Field

The present invention relates to determining the presence and absence of a plurality of devices on a bus. More specifically, it relates to a method and system for determining whether devices are present at those connection points available on a bus in a computer system at system startup as well as while the system is operating.

2. Description of the Related Art

In computer systems providing for client server architecture wherein client and server are interconnected over a network, it is desirable to minimize server down time. Frequently servers include provisions for attaching what are known as hot plug devices meaning that these devices may be changed out without powering down the system and therefore minimizing down time and service interruptions to clients.

One common way of identifying configuration changes is the use of sense lines or self notification. In the case of hot plug configuration changes the added device itself provides notification. This capability means that some degree of intelligence must be included within the hot plug device. Hot plug detection typically is achieved using a present detect bit included within each component that can be attached or removed from the system.

U.S. Pat. No. 5,834,856 to Tavallaei, et al., relates to a method for a periodically testing redundant devices in a computer system. A redundant device may be hot pluggable so that the computer system need not be shut down when the primary or redundant devices need to be replaced. Both primary and redundant devices are in communication with the device controller which is adapted to check the operability of the primary device and keep the redundant devices normally off. The redundant devices are made operational for predetermined intervals for predetermined periods of time in order to determine whether the redundant device could be operational if the primary device failed.

IBM Technical Disclosure Bulletin Vol. 37, No. 06B, June 1994, describes a dynamic update capability for determining planar board features. A word field dependent on the planar board may be upgraded to reflect a large number of combination of features on the board and it makes it possible to indicate various functional changes applied to the planar board during the manufacturing process.

Copending, commonly assigned U.S. patent application Ser. No. 09/163,992 relates to an I²C Bus Expansion apparatus with which the present invention may be used the disclosure of this application is herewith incorporated by reference in its entirety.

BRIEF SUMMARY OF THE INVENTION

The shortcomings of the prior art as described above may be overcome by providing a method and system useful at system startup and run-time phases in which a microprocessor, serving as a switch between a main bus and several sub buses, polls all of the sub-bus addresses at which devices may be attached. At system startup, determining presence of devices is important because there is no way, otherwise, to know what hardware devices may have been added or removed from the computer system when it is powered down.

If this task is left to the main bus controller then startup times are increased. However, as is practiced in the prior art at it is often preferable to distribute that responsibility so that a master controller is free to focus on other start-up issues. Once the run-time phase of the computer system is entered it is desirable to periodically determine whether any of the hot plug devices have been added or removed from the system.

The method and system of the present invention solve both problems by allocating the task of polling all devices to a small microprocessor which then stores in a specific memory area an indication of the presence and other information about the device at each possible address at which a device could be attached. Once the run-time phase has begun, polling all sub-bus addresses is done continually so that the memory area contains in real time the current component/device status of all devices attached to the bus.

Advantageously the present invention accelerates the speed at which the start-up phase occurs. Thus, in a system provided with the present invention, once a polling command is issued, hub controller(s) connecting various sub-buses to the main bus begin to poll all of the device slots. This polling occurs sequentially by sending out a signal on the bus to each available address and then waiting to determine if an acknowledge (ACK) response is returned from that address. Once an ACK response is returned, a notation is made in the component map in the specified memory area. If no ACK is returned an appropriate notation is entered into the memory map. This process of address interrogation continues until all possible addresses are checked. At the end of this address interrogation sequence, there results a map in memory of all possible component connections with an indication, inter alia, of the presence of devices at those addresses.

BRIEF DESCRIPTION OF THE DRAWINGS

The above-noted and other features and advantages of the present invention will be better understood having reference to the accompanying drawing wherein like numerals are used throughout to indicate like elements and wherein.

DETAILED DESCRIPTION OF THE PREFERRED EMBODIMENT

Figure 1:
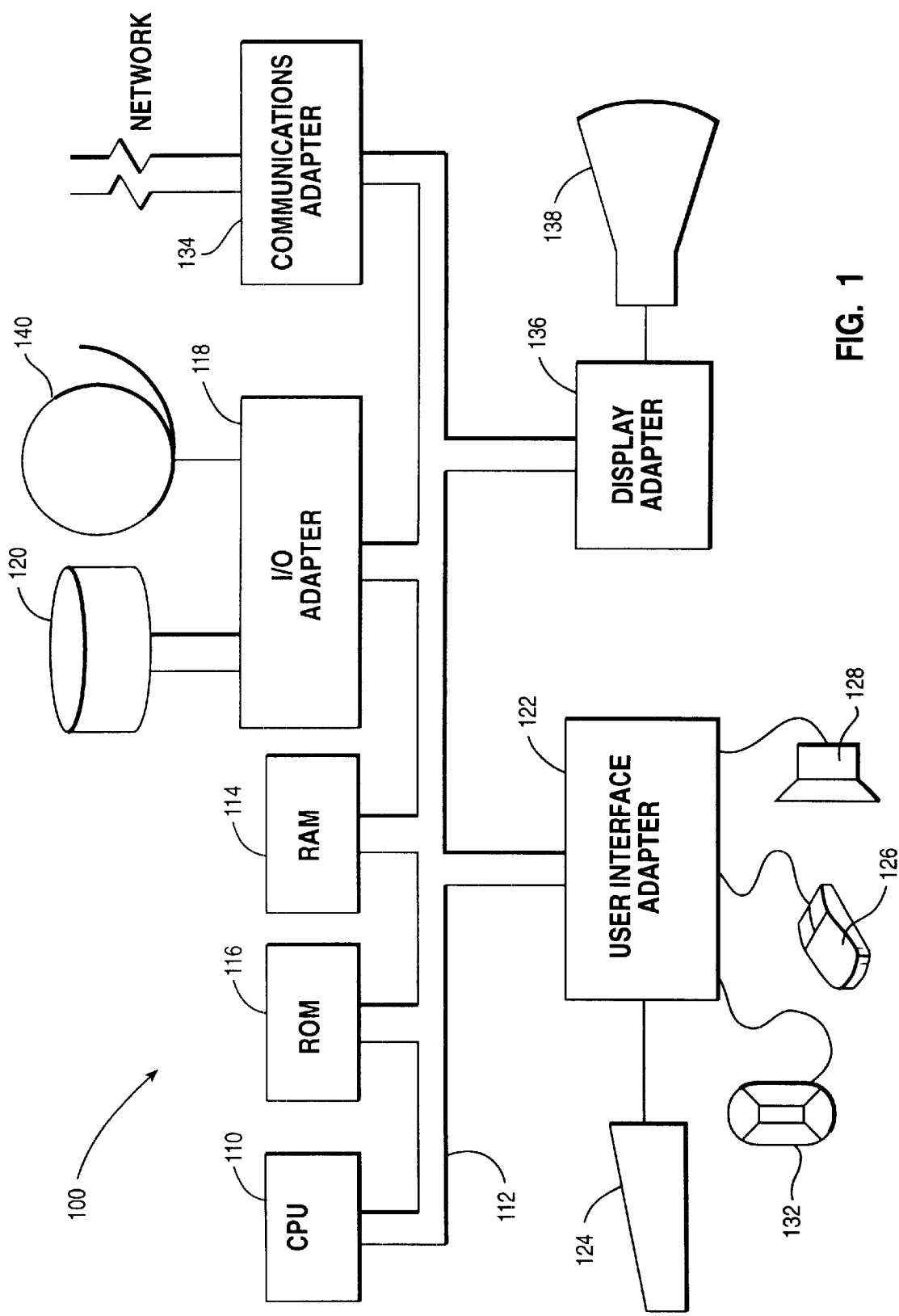
FIG. 1 is a block diagram illustrating a computer system in which the present invention may be practiced.

Refer now to FIG. 1 a representative hardware environment in which the present invention may be practiced. FIG. 1 illustrates a typical hardware configuration for data processing system 100. Data processing system 100 includes a central processing unit (CPU) 110 such as a conventional microprocessor and a number of other units interconnected via system bus 112. A portion of system bus 112 may be an I²C bus. Data processing system 100 includes, further, random access memory (RAM) 114, read only memory (ROM) 116, and input/output (I/O) adapter 118 for connecting peripheral devices such ass disk units 120 and tape drives 140 to system bus 112, user interface adapter 122 for connecting keyboard 124, mouse 136 and/or other user interfaces devices such as a touch screen device (not shown)

to bus 112, communication adapter 134 for connecting data processing system 100 to a data processing system network and display adapter 136 for connecting bus 112 to display bus 138.

CPU 110 may include other circuitry not shown herein which may include circuitry, commonly found within a microprocessor, e.g., an execution unit, bus interface unit, arithmetic logic unit, etc. CPU 110 may also reside on a single integrated circuit.

Figure 2:
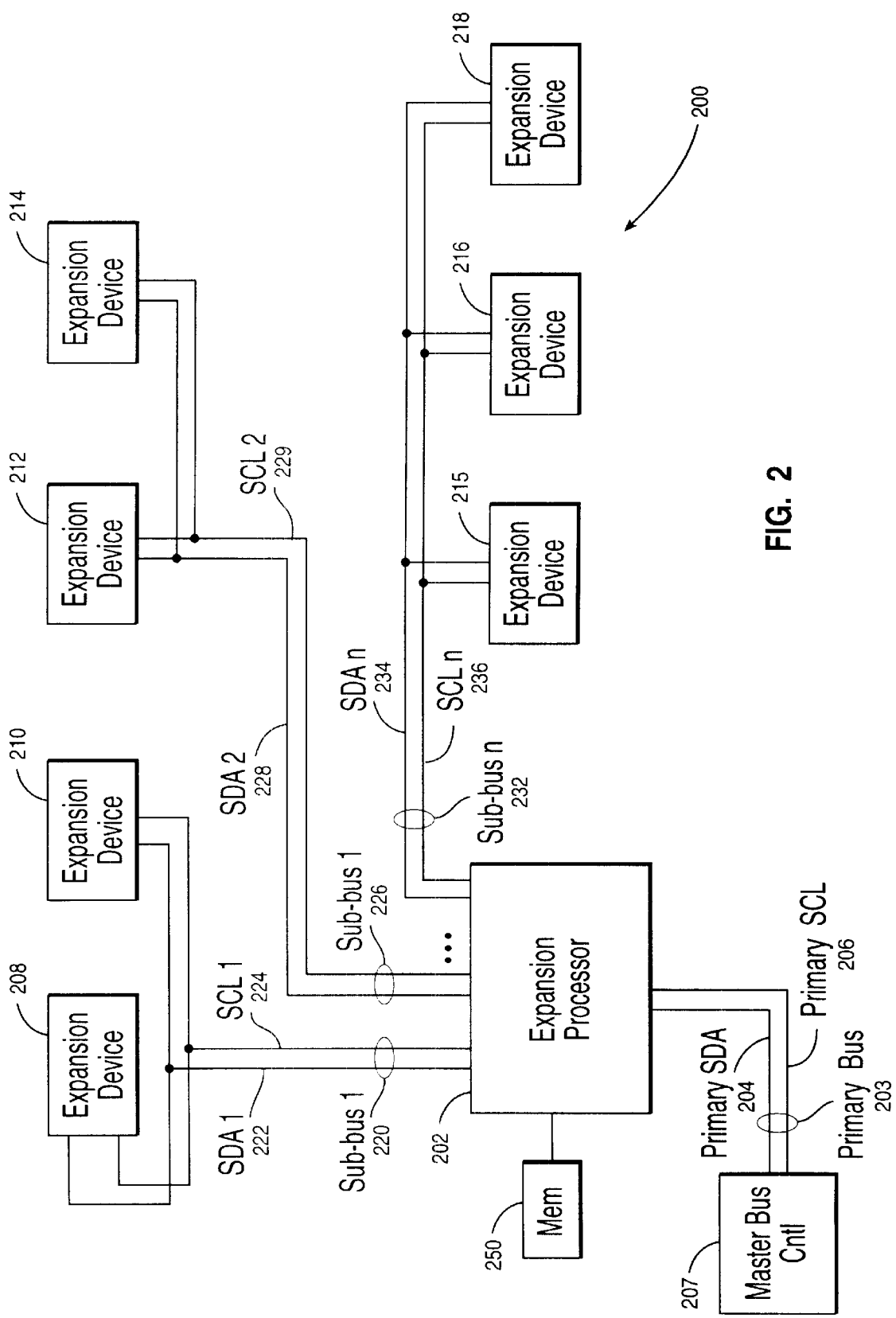
FIG. 2 is a block diagram showing the interrelationships between the hardware elements used in practicing the current invention.

Refer now to FIG. 2 in which is illustrated I²C expansion apparatus 200 in accordance with the principles of the present invention. Expansion processor 202 resides on primary I²C bus 203 which includes primary SDA 204 and primary SCL 206. An embodiment of expansion processor 202 may include a conventional microcontroller having I²C compatibility such as an 83C751 or, alternatively, 87C751, microcontroller manufactured by Phillips Semiconductors. (These two devices differ only in the form of internal program memory.) Expansion processor 202 may be an I²C slave responding to requests from a I²C bus master 207 residing on primary I²C bus 203. Bus master 207 may initiate requests for an I²C transaction (either a read or a write) to a plurality of expansion devices, 208, 210, 212, 214, 216, and 218. These expansion devices may include any I²C compatible device, and may include, but are not necessarily limited to, mircoprocessors, gate arrays, liquid crystal display (LCD) drivers, memory, data converters, and application oriented devices.

Communications between bus master 207 and one of the expansion devices is mediated by expansion processor 202. Each of expansion devices 208, 210, 212, 214, 216 and 218 is coupled to expansion processor 202 by one of a plurality of I²C buses, sub-bus 220 through sub-bus 230.

Each sub-bus includes a two-wire pair. Sub-bus 220 includes SDA 222 and SCL 224, coupling expansion devices 208 and 210 to expansion processor 202. Similarly, sub-bus 226 includes SDA 228 and SCL 229 which couples expansion devices 212 and 214 to expansion processor 202. Sub-bus 232 includes SDA 234 and SCL 236 coupling expansion processor 202 to expansion devices 215, 216, and 218.

In an embodiment of the present invention in which expansion processor 202 is implemented with a conventional microcontroller, sub-buses 220, 226, and 232 may be driven from device input/output (I/O) pins. It will be understood by one of ordinary skill in the art that each of sub-buses 220, 226, and 232 may couple other numbers of expansion devices to expansion processor 202 consistent with I²C specifications.

In operation, bus master 207 communicates with one of the expansion devices by addressing expansion processor 202, which is hereinafter also referred to as a sub-bus controller. Sub-bus controller 202 is assigned a preselected I²C address as an I²C device on primary bus 203.

Memory device 250 associated with sub-bus 232 is provided in accordance with the present invention for maintaining information about the presence/absence of and other aspects of devices connected to sub-buses 220, 226, and 232. While one sub-bus controller is shown in the drawing, those having skill in the art will understand that a system may be easily configured to include multiple sub bus controllers under control of a master bus controller.

Figure 3:
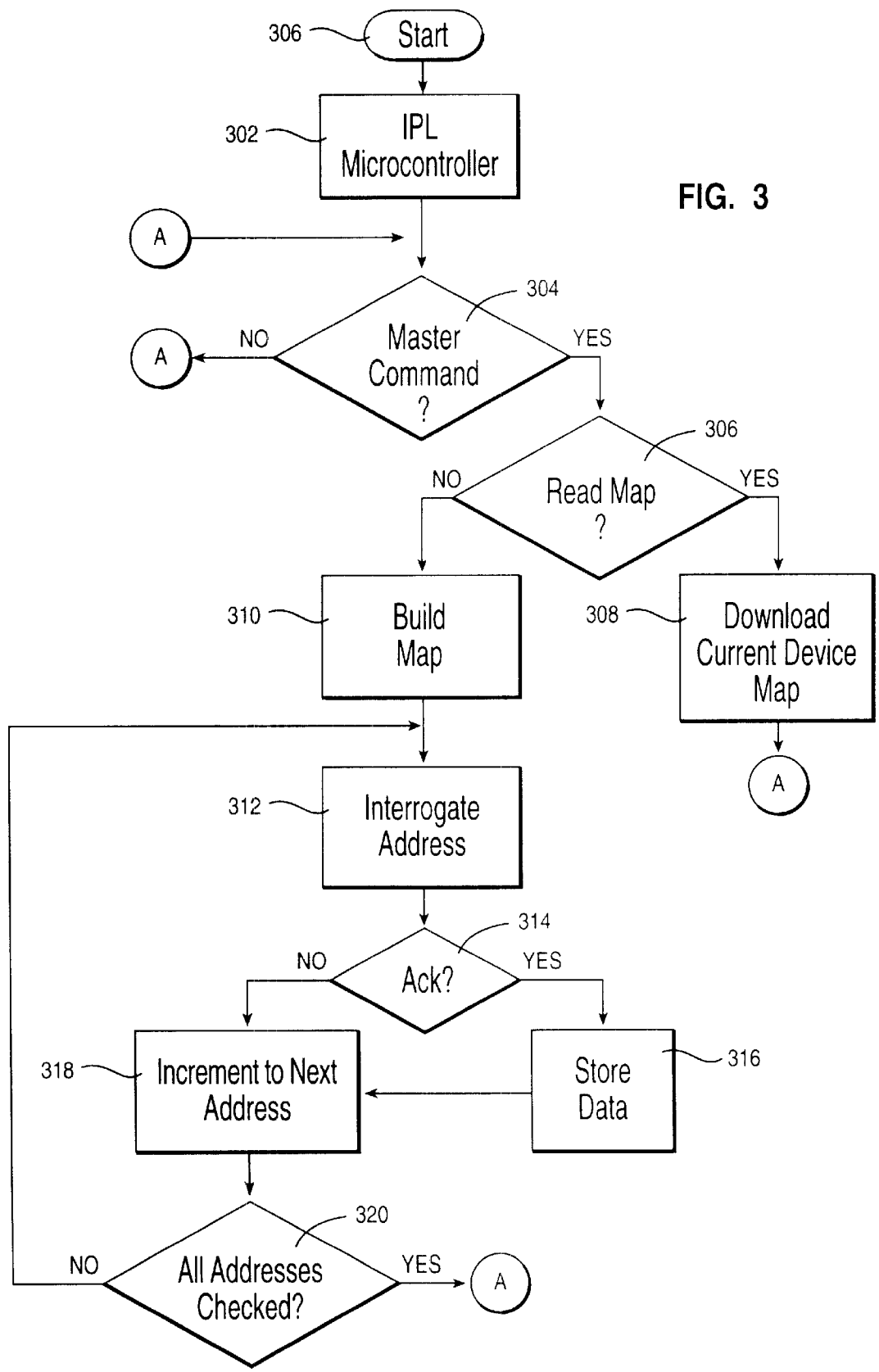
FIG. 3 is a flow chart illustrating the logic implemented in hub controller 202, FIG. 2 for performing polling in accordance with the present invention.

FIG. 3 illustrates the logic executed in practicing the method of the present invention. The logic is entered at terminal 300. At block 302 the microcontroller comprising sub bus controller 202, FIG. 2, undergoes initial program load. At block 304 a determination is made whether there is a command present from master bus controller 207. If not, the logic loops until a command is present. When a command from master bus controller 207 is present, the logic at block 306 determines whether to read a device map stored in memory 250. If so, the current device map is downloaded at step 308 and the logic loops back to await a command from master bus controller 207.

If the command examined at step 306 was not to read an existing device map, logic is entered at step 310 to commence building a device status map. At block 312, each hub controller progresses through the addresses under its control by sending a signal to each address and awaiting an acknowledgement, ACK, to be returned. Then, at block 314 a branch is taken to block 316 if an acknowledgment is received and an indication of the presence of the device is stored in memory device 250 (FIG. 2) of microprocessor comprising hub controller 202. The logic increments to the next device address at block 318. At block 320 a test is made to determine if all the addresses associated with all of the sub buses attached to that hub controller have been addressed. If yes, the logic returns to step 304 to await a command from bus master 207. If more addresses remain, the logic returns to block 312 and continues by updating the sub bus address, interrogating device addresses and awaiting receipt of an acknowledgement.

Returning now to test 314, if no acknowledgment is received from a given address, it is assumed that no device is present at that address and the logic branches to block 318 to go to the next address before testing at step 320 to determine if all addresses have been interrogated.

The invention is not limited to the particular configuration illustrated. Nor is it limited to a serial bus. Rather, practice of the present invention requires only the availability of a smaller microprocessor for each of some fixed number of available device connection slots. The microprocessor described as a sub-bus controller herein, performs the logic sequence of FIG. 3 at system start-up and periodically during active run-time. Thus, there is available in memory a real-time indication of device presence or absence at every available connection slot. In this manner, the present invention thereby enables system configuration assessment in a cost and time effective manner and enables further processing, reporting, alarm setting or the like to occur likewise in a timely manner. A significant advantage of the invention resides in speeding up system start-up cycle times and maintaining a real-time map of device presence status.

While the present invention has been described having reference to a particular preferred embodiment using an I²C bus those having skill in the art will appreciate modifications and variations in form and detail may be made to apply to the present invention with other bus types without departing from the scope and intent of the appended claims.

What is claimed is:

1. A method for obtaining a real time component status map in a computer system including a bus interconnected with a plurality of sub buses, each interconnection including a sub bus hub controller, each sub bus capable of having a number of devices attached thereto, comprising the steps of:

issuing a polling command to each sub bus hub controller in response to a bus polling command;

sequentially sending a signal to each available address on each sub bus;

awaiting an acknowledge response from each address;

responsive to receipt of said acknowledge response, entering data into a specified memory; and, repeating said sending, awaiting and entering steps until all possible addresses are checked.

2. The method of claim 1 wherein said issuing step is preceded by:
specifying a memory area having address spaces equal to a number corresponding to every possible device to bus connection.

3. The method of claim 2 wherein said issuing step comprises:
tracking completion of a device polling cycle; and
periodically issuing a new polling command.

4. The method of claim 3 wherein said entering step includes placing data in an address space.

5. Apparatus for determining whether bus connectable devices are present in an information handling system including a master bus controller connected to a plurality of sub bus controllers, each sub bus controller having a plurality of sub buses under its control and each sub bus having a known number of device connection points, comprising:
a memory associated with each sub bus controller, having a plurality of address spaces corresponding in quantity to sub bus device connection points;
means in each said sub bus controller, operable in response to a poll command from said master bus controller, for interrogating each device connection point on said sub bus; and
means in each sub bus controller for storing results of said interrogating in said memory.

6. The apparatus of claim 5 wherein said means for interrogating includes:
means for sending a signal to each device connection point; and
means for sensing an acknowledge response from said device connection point.

7. The apparatus of claim 6 wherein said means for storing includes:
means for entering a first indicator when said means for sensing detects an acknowledge response; and
means for entering another indicator when said means for sensing does not detect an acknowledge response.

8. A method for determining whether sub bus connectable devices are present in an information handling system including a master bus controller connected to a plurality of sub bus controllers, each sub bus controller having a plurality of sub buses under its control and each sub bus having a known number of device connection points, comprising:
providing a memory associated with each sub bus controller, having a plurality of address spaces corresponding to sub bus device connection points;
in response to a poll command from said master bus controller, interrogating each device connection point on each sub bus; and
storing results of said interrogation in said memory.

9. The method of claim 8 wherein said interrogating step includes:
sending a signal to each device connection point; and
sensing an acknowledge response from said device connection point.

10. The method of claim 8 wherein said storing step includes:
entering a first indicator when said sensing step detects an acknowledgement; and
entering another indicator when said sensing step does not detect an acknowledgement.

11. Apparatus for obtaining a real time component status map in a computer system including a bus interconnected with a plurality of sub buses, each interconnection including a sub bus hub controller, each sub bus capable of having a number of components attached thereto, comprising:
means for issuing a polling command to each sub bus hub controller in response to a bus polling command;
means for sequentially sending a signal to each available address;
means for awaiting an acknowledge response from each address;
means, responsive to receipt of an acknowledge response, for entering data into a specified memory area; and
means for repeatedly, sequentially activating said sending, awaiting and entering means until all possible addresses are checked.

12. The apparatus of claim 11 additionally including:
means responsive to passage of a predetermined time period for reissuing said polling command.

13. The apparatus of claim 11 wherein said means for issuing is operable during system initial program load.

14. The apparatus of claim 12 wherein said means for entering includes:
means for storing an indicator of component presence upon receiving an acknowledge response.

15. The apparatus of claim 13 wherein:
said means for entering enters an indication component absence upon receiving no acknowledge response.

16. A computer program, having data structures included on a computer readable medium, which generates a real time device status map in a computer system including a bus interconnected with a plurality of sub buses, each interconnection including a sub bus hub controller, each sub bus capable of having a number of device attached thereto comprising:
means for issuing a polling command to each sub bus hub controller in response to a bus polling command;
means for sending a signal to each available address;
means for awaiting an acknowledge response from each address;
means responsive to receipt of said acknowledge response, for entering data into a specified area of a memory having addresses correlating to every connection point on every sub bus; and
means for repeatedly, sequentially activating said sending, awaiting and entering means until all possible addresses are checked.

17. The computer program of claim 16 additionally including:
means responsive to passage of a predetermined time period for issuing a polling command.

18. The computer program of claim 17 wherein said means for issuing is operable during system initial program load.

19. The computer program of claim 17 wherein said means for entering enters an indicator of component presence upon receiving an acknowledge response.

20. The computer program of claim 19 wherein said means for entering enters an indicator of component absence upon receiving no acknowledge response.

* * * * *